Nov. 2, 1926.
G. C. CONN ET AL
1,605,579
DECK BRACE
Filed May 25, 1922
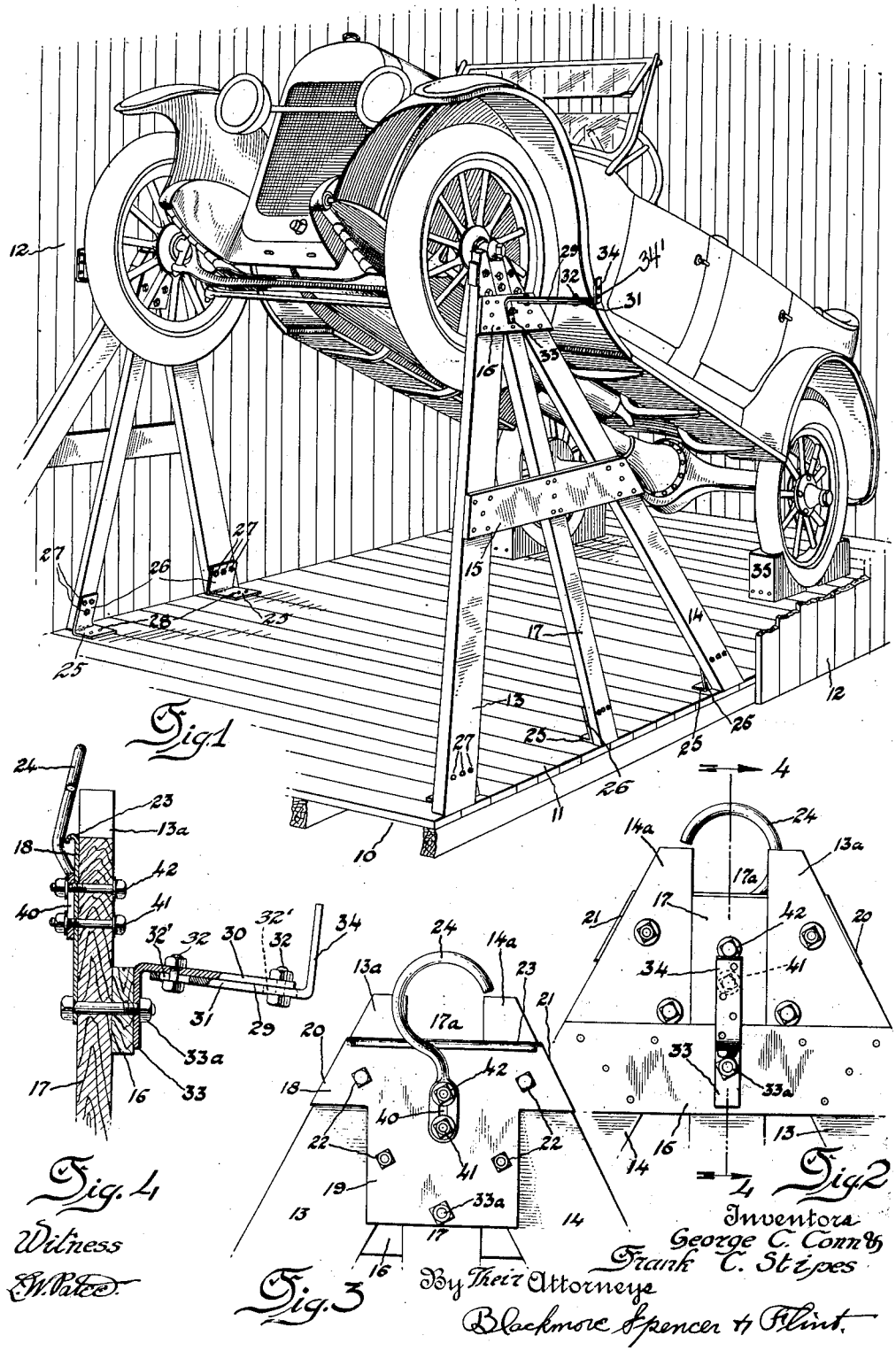

Patented Nov. 2, 1926.

1,605,579

UNITED STATES PATENT OFFICE.

GEORGE C. CONN, OF FLINT, MICHIGAN, AND FRANK COVER STIPES, OF HARRISONBURG, VIRGINIA, ASSIGNORS TO GENERAL MOTORS CORPORATION, OF DETROIT, MICHIGAN, A CORPORATION OF DELAWARE.

DECK BRACE.

Application filed May 25, 1922. Serial No. 563,554.

This invention relates to means for decking or semi-decking automobiles in freight cars and the like for the purpose of shipment.

One of the objects of the invention is the provision of supporting and bracing means for securing an automobile in position for shipment, of such a nature that it may be shipped back to the factory and used over again a number of times for the same purpose.

Another object of the invention is the provision of a decking device with new and improved means for securing the same to the floor of a shipping conveyance and for adjustably securing the same to the side walls thereof.

A still further object of the invention is the provision of a metallic head for securing the upper ends of the supporting and bracing members together and so constructed as to materially add to the strength and safety of the device; together with new and improved means for securing the hub thereto.

Other and further objects of the invention will appear as the description proceeds.

On the drawing:

Figure 1 represents a perspective view of a portion of a freight car with an automobile securd therein in a semi-decked position.

Figure 2 is a side elevation of the upper portion of the inside of the trapezoidal supporting and bracing member.

Figure 3 is a view similar to that shown in Figure 2 showing an outside elevation.

Figure 4 is a section on lines 4—4, of Figure 2.

Referring to the drawings the numeral 10 designates the freight car or other shipping conveyance having the floor 11 and side walls 12.

As shown on the drawing the automobile is semi-decked but it is understood that it may be full-decked if desired by employing the improved supporting and bracing members for supporting both ends of the automobile. When the automobile is semi-decked two of the improved supporting and bracing members are employed, one at each side of the car. Each decking device or supporting and bracing member may be considered as consisting of a trapezoidal arrangement having the two supporting members 13 and 14 spaced apart at their lower ends and so arranged that they converge toward their upper ends. These members may be of any suitable material, but for cheapness of construction they may be, and preferably are, wooden members. A brace 15 is properly secured to the two supporting members 13 and 14 intermediate their ends in any suitable manner as by means of nails, bolts or screws. An additional brace 16 is secured to the upper ends of the supporting members 13 and 14 to give additional security.

A central support 17 preferably arranged in the plane of the supports 13 and 14 and between the same and having its upper end extending between the upper ends of the braces 13 and 14 is also employed. This support 17 being so arranged that it is, in use, substantially in the vertical plane of the axle, constitutes the principal support of the automobile as the hub rests directly on it. The support 17 terminates short of the upper ends of the members 13 and 14. The hub of the wheel is adapted to be engaged on its under side by the upper end of the support 17 and to be held from lateral movement thereon by the upper extensions 13ᵃ and 14ᵃ of the members 13 and 14.

A metallic head 18 is adapted to engage the upper or converging ends of the supporting members 13, 14 and 17 for securing these members together and also for constituting a support for the center of the hub of the wheel. Each head 18 may be said to be in the form of a trapezoid and consists of a side plate 19 of any suitable form as T-shape. Each plate is provided with end flanges 20 and 21 at each end thereof. These heads may be stamped from sheet metal or formed in any other suitable manner. The side plates and flanges are so arranged that they are adapted to engage and fit three sides of the upper end of the supporting members and are adapted to be secured thereto by any suitable means such as the bolts. The side plate 19 has its upper edge bent outwardly and downwardly as at 23 to provide a convex surface for engaging an intermediate portion of the hub of the wheel. The convex surface prevents marring or injuring the finish on the hub and also affords a partial support for the hub. When the hub is in position between the upper ends 13ᵃ and 14ᵃ of the supporting members 13 and 14 it is supported by the member 17 and by the head 18. The weight of the vehicle on the head 18 tends to force the said head downwardly on the supporting members 13 and 14 and cause the flanges 20 and 21 to clamp the supporting members 13 and 14 against the central supporting member 17 thus binding said members together and reinforcing the same. Moreover, this convex member is adapted to engage a reduced portion of the hub of the wheel to prevent lateral movement of the automobile and consequently retain the same in fixed position in the shipping conveyance. By the use of this form of head the parts are so rigidly held together that the bracing and supporting members may be returned to the manufacturer and used over again a number of times. This is an important feature of this invention since it saves material and lessens the cost of transportation.

The supporting members 13 and 14 have their upper ends extending beyond the main support 17, and these extensions together with the upper end of the support 17 and the curved edge 23 of plate 18 form a seat 17ª for the hub of the wheel which is adapted to be secured thereto.

Suitable means are provided for clamping each hub in position on the supporting member within the seat 17ª. As shown on the drawings, this means consists of a hooked shaped member 24 having the attaching shank thereof provided with a slot 40 in which is adapted to engage the bolts 41 and 42. The bolt 41 is a removable one and when it is removed the slot 40 will permit the hook 24 to be elevated and turned in order to permit the hub to enter the seat 17ª after which the hook may be turned back and forced downwardly into engagement with the hub of the wheel and be secured in such position by the bolt 41.

In practice, when the device is employed, protective padding is placed about the hub before it is secured in position in the supporting member. For the purpose of illustration, however, this padding is omitted from the drawing.

The lower ends of the supports 13, 14 and 17 are provided with securing plates 25 for securing the lower ends of the supports to the floor of the shipping conveyance for preventing relative movement between the floor and said supports. These plates may be stamped from sheet metal and have the body portion 26 which is adapted to be detachably secured to the supports by any suitable fastening means such as bolts 27. The securing plates 25 are provided with feet which are adapted to engage the floor of the shipping conveyance and to be secured thereto by nails, screws or other fastening devices 28.

For the purpose of adjusting the upper ends of the bracing and supporting members to accommodate them to freight cars of different tread and different hub structures, as well as for bracing the same in the shipping conveyance, adjustable braces 29 may be employed. These braces may be arranged in any suitable manner so long as they are adjustable. One form of adjustable brace shown on the drawing consists of two members 30 and 31 which may be connected together by the usual bolt and slot connection as shown at 32, 32' in Figure 4. The member 30 is provided with an attaching foot 33 whereby the brace is secured to the support and bracing member by any suitable means such as one or more bolts or screws 33ª. The member 31 is provided with a foot 34 having the apertures 34' therethrough whereby the same may be detachably secured to the wall of the freight car or other shipping conveyance by any suitable means such as bolts or screws.

When it is desired to semi-deck an automobile as shown in Figure 1 two of the wheels at one end of the car are blocked or secured in any suitable manner. As shown in Figure 1, they are secured in position by means of blocks 35 arranged to engage the front and rear of the wheels and secured to the floor of the car. The other end of the car is elevated and one of the supporting and bracing members is placed beneath the hub of each wheel. The lower ends of the supporting and bracing members are secured to the floor of the car by the plates 25 in such a position that the lower ends of these members are also in contact with the side of the car. The braces 29 are adjusted to the proper position and secured to the side walls of the freight car or other shipping conveyance. The hub is also secured in position in its seat by means of the hook 24.

By removing the nuts from the bolts 27 the bracing and supporting members may be detached from the floor of the car and after being detached from the side wall of the car and the hub of the wheel they may be removed and afterwards returned for further use. If preferred, however, the bracing and supporting members may be detached from the floor of the shipping conveyance by removing the fastening means in the feet portion of the plates 25.

It will thus be seen that each bracing and supporting member or decking device described above may be manufactured principally from wooden material and consequently is light in weight and is easily constructed; and that the arrangement of the parts is such that the device is strong and durable and may be shipped back to the factory to be used over and over again.

Attention is especially directed to the fact that the weight of the car on the metallic head piece, tends to bind the parts together to form a structure that under all conditions of use is rigid and reliable, thus making it possible to re-employ the deck a number of times. Moreover, the adjustable braces permit the devices to be properly adjusted to the automobile whereby the same is securely fastened to the shipping conveyance and thus prevented from moving in any direction during shipment. The arrangement of the devices, also, is such that the bracing and supporting members afford the minimum obstruction to the positioning of another automobile beneath the one supported by them.

It is thought from the foregoing taken in connection with the accompanying drawings that the construction and operation of our device will be apparent to those skilled in the art, and that various changes in size, shape, proportion and details of construction may be made without departing from the spirit and scope of the appended claims.

We claim:

1. A head for a decking device consisting of a side plate having its upper end bent outwardly and downwardly to form a convex upper surface for engaging a wheel hub and side flanges located at the sides of said side plate, substantially as shown and described.

2. In a device of the class described, a head for a decking device, means for securing the same to said device, a hook-shaped fastening member for engaging the hub of a wheel, said member provided at its lower end with a slot and means associated with said head for engaging said slot for securing said fastening member in position thereon, substantially as shown and described.

3. In a decking device of the class described, upwardly extending members spaced apart at their lower ends and in contact at their upper ends, a trapezoidal metallic head fitted about the upper ends of said members and having a seat for the wheel hub, means whereby the weight borne by said head acts to force the upper ends of said members into engagement with one another, and means for securing said head to said members.

4. In a device of the class described, a supporting member, bracing members forming with said supporting member, a trapezoidal decking support, said members forming a seat for a wheel hub, a metallic side plate, means for securing the same to said members, said side plate being provided with a hub engaging upper surface and with side flanges for engaging the edge faces of said bracing members, a retaining member slidably and pivotally connected to the upper end of said decking support and means for securing said retaining member in engagement with a wheel hub to retain the same in said seat and in engagement with said plate, substantially as shown and described.

5. In an automobile-shipping deck, supporting legs converging toward the wheel hub of the automobile, and a head supporting the hub and having parts engaging the outer inclined surfaces of said legs in such a manner that the weight of the automobile wedges the upper ends of the legs together and into engagement with one another.

In testimony whereof we affix our signatures.

GEORGE C. CONN.
FRANK COVER STIPES.